(12) United States Patent
Blazer

(10) Patent No.: US 12,353,042 B2
(45) Date of Patent: *Jul. 8, 2025

(54) OPTICAL CABLE WITH SZ STRANDED ROUTABLE FIBER CARRYING SUBUNITS

(71) Applicant: CORNING RESEARCH & DEVELOPMENT CORPORATION, Corning, NY (US)

(72) Inventor: Bradley Jerome Blazer, Granite Falls, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 18/128,495

(22) Filed: Mar. 30, 2023

(65) Prior Publication Data
US 2023/0236380 A1   Jul. 27, 2023

Related U.S. Application Data

(63) Continuation of application No. PCT/US2021/052285, filed on Sep. 28, 2021.

(60) Provisional application No. 63/087,537, filed on Oct. 5, 2020.

(51) Int. Cl.
*G02B 6/44* (2006.01)

(52) U.S. Cl.
CPC ................... *G02B 6/449* (2013.01)

(58) Field of Classification Search
CPC ....... G02B 6/441; G02B 6/4413; G02B 6/449
See application file for complete search history.

(56) References Cited

U.S. PATENT DOCUMENTS

| | | | |
|---|---|---|---|
| 4,331,378 A | 5/1982 | Hartig | |
| 4,496,214 A | 1/1985 | Oestreich et al. | |
| 5,517,591 A | 5/1996 | Wagman et al. | |
| 6,188,821 B1 | 2/2001 | McAlpine et al. | |
| 6,321,013 B1 | 11/2001 | Hardwick et al. | |
| 6,453,098 B2 | 9/2002 | Elisson et al. | |
| 6,546,712 B2 | 4/2003 | Moss et al. | |
| 6,671,441 B1 | 12/2003 | Bocanegra et al. | |
| 6,768,845 B1 | 7/2004 | Suetsugu et al. | |

(Continued)

FOREIGN PATENT DOCUMENTS

| | | | |
|---|---|---|---|
| KR | 10-0429505 B1 * | 5/2004 | |
| WO | 2015/102817 A1 | 7/2015 | |
| WO | 2019/124077 A1 | 6/2019 | |

OTHER PUBLICATIONS

International Search Report and Written Opinion of the International Searching Authority; PCT/US2021/052285; dated Dec. 29, 2021; pp. 09; International Searching Authority.

(Continued)

*Primary Examiner* — Michael Stahl
(74) *Attorney, Agent, or Firm* — Thomas R. Irwin

(57) ABSTRACT

An optical fiber cable that includes subunits is provided. Optical fiber cables are used to transmit data over distance. The subunits are twisted and stranded within the cable to reduce degradation of stranding during use of the cable. The subunits of one or more optical fiber cables are arranged in complimentary configurations that counteract their varying asymmetrical forces to provide an improved handling performance for the optical fiber cable.

20 Claims, 6 Drawing Sheets

(56) References Cited

U.S. PATENT DOCUMENTS

| | | |
|---|---|---|
| 6,895,150 B2 | 5/2005 | Stingl |
| 7,630,605 B2 | 12/2009 | Bringuier et al. |
| 8,620,124 B1 | 12/2013 | Blazer et al. |
| 9,188,754 B1 | 11/2015 | Risch et al. |
| 9,733,443 B2 | 8/2017 | Blazer et al. |
| 10,388,434 B1 | 8/2019 | Gebs |
| 11,340,414 B2 | 5/2022 | Blazer et al. |
| 2003/0099447 A1 | 5/2003 | Stingl |
| 2004/0240809 A1 | 12/2004 | Tedder et al. |
| 2004/0252954 A1 | 12/2004 | Ginocchio et al. |
| 2005/0018983 A1 | 1/2005 | Brown et al. |
| 2006/0127016 A1 | 6/2006 | Baird et al. |
| 2008/0013899 A1 | 1/2008 | Gowan et al. |
| 2009/0274425 A1 | 11/2009 | Caldwell et al. |
| 2014/0086543 A1 | 3/2014 | Blazer et al. |
| 2015/0355430 A1 | 12/2015 | Clampitt et al. |
| 2016/0306129 A1 | 10/2016 | Hurley et al. |
| 2017/0131496 A1 | 5/2017 | Blazer et al. |
| 2017/0219791 A1 | 8/2017 | Sinkfield et al. |
| 2017/0293097 A1 | 10/2017 | Ito et al. |
| 2018/0180831 A1 | 6/2018 | Blazer et al. |
| 2019/0121043 A1 | 4/2019 | Baucom et al. |
| 2020/0142144 A1 | 5/2020 | Blazer et al. |
| 2020/0310058 A1 | 10/2020 | Blazer et al. |
| 2021/0141178 A1* | 5/2021 | Kaji .................. G02B 6/4413 |
| 2023/0258895 A1* | 8/2023 | Blazer .................. G02B 6/443 385/102 |

OTHER PUBLICATIONS

Extended European Search Report, EP application No. 21878231.6, dated Oct. 17, 2024, 5 pages, European Patent Office.

* cited by examiner

OPTICAL CABLE WITH SZ STRANDED ROUTABLE FIBER CARRYING SUBUNITS

CROSS-REFERENCE TO RELATED APPLICATIONS

This application is a continuation of International Application No. PCT/US2021/052285 filed Sep. 28, 2021, which claims the benefit of priority of U.S. Provisional Application Ser. No. 63/087,537 filed on Oct. 5, 2020, the content of which is relied upon and incorporated herein by reference in its entirety.

BACKGROUND

The present invention is related to optical fiber cables with subunits and more particularly to optical fiber cables with improved mechanical properties resulting from the configuration of the subunits. Optical fiber cables are used to transmit data over distance. In some situations, large distribution cables that carry a multitude of optical fibers from a hub are sub-divided at network nodes into subunits. Described herein are cables with subunits having improved handling and other mechanical properties.

According to an aspect, embodiments of the disclosure relate to an optical fiber cable. The optical fiber cable includes an outer jacket, a first optical fiber carrying subunit and a second optical fiber carrying subunit. The outer jacket includes a first inner surface and a first outer surface that defines an outermost surface of the optical fiber cable. The first inner surface defines a central bore that extends in a longitudinal direction between a first end and an opposing second end of the outer jacket. The first optical fiber carrying subunit and the second optical fiber carrying subunit are stranded through the central bore of the outer jacket in an S-Z stranding pattern. Each of the first optical fiber carrying subunit and second optical fiber carrying subunit includes a subunit jacket defining an inner bore and a plurality of optical fibers located within the inner bore of the subunit jacket. The plurality of optical fibers in the first optical fiber carrying subunit are twisted within the first subunit jacket in a first rotational direction as the first optical fiber carrying subunit extends from the first end to the second end of the outer jacket, and the plurality of optical fibers in the second optical fiber carrying subunit are twisted within the second subunit jacket in a second rotational direction opposite the first rotational direction as the second optical fiber carrying subunit extends from the first end to the second end of the outer jacket. The subunit jacket of the first optical fiber carrying subunit contacts the subunit jacket of the second optical fiber carrying subunit.

In another aspect, embodiments of the disclosure relate to an optical fiber cable. The optical fiber cable includes an outer jacket, a first optical fiber carrying subunit and a second optical fiber carrying subunit. The outer jacket includes a first inner surface and a first outer surface that defines an outermost surface of the optical fiber cable. The first inner surface defines a central bore that extends in a longitudinal direction between a first end and a second end of the outer jacket. The first optical fiber carrying subunit and a second optical fiber carrying subunit are stranded through the central bore of the outer jacket in an S-Z stranding pattern. Each of the first optical fiber carrying subunit and second optical fiber carrying subunit includes a subunit jacket that defines an inner bore and a plurality of optical fibers located within the inner bore of the subunit jacket. The plurality of optical fibers of the first optical fiber carrying subunit are twisted in a first rotational direction within the first subunit jacket as the first optical fiber carrying subunit extends from the first end to the second end of the outer jacket, and a center of the first optical fiber carrying subunit is located at a first radius from a center of the central bore. The plurality of optical fibers of the second optical fiber carrying subunit are twisted in a second rotational direction within the second subunit jacket opposite the first rotational direction as the second optical fiber carrying subunit extends from the first end to the second end of the outer jacket. A center of the second optical fiber carrying subunit is located at a second radius from a center of the central bore, and the second radius is within 50% of the first radius.

In yet another aspect, embodiments of the disclosure relate to a method of manufacturing an optical fiber cable. The method includes unspooling a first optical fiber carrying subunit, the first optical fiber carrying subunit including a first subunit jacket and a plurality of optical fibers.

The first subunit jacket includes a first inner surface and a first outer surface. The first inner surface defines a first inner bore. The plurality of optical fibers are located within the first inner bore and extend within the subunit jacket. The plurality of optical fibers are twisted within the first subunit jacket in a first rotational direction.

The method further includes unspooling a second optical fiber carrying subunit, the optical fiber carrying subunit including a second subunit jacket and a plurality of optical fibers. The second subunit jacket includes a second inner surface and a second outer surface. The second inner surface defines a second inner bore. The plurality of optical fibers are located within the second inner bore and extend within the subunit jacket. The plurality of optical fibers are twisted within the second subunit jacket in a second rotational direction opposite the first rotational direction.

The method further includes unspooling a central elongate member, S-Z stranding the first optical fiber carrying subunit and the second optical fiber carrying subunit around the central elongate member, and extruding a polymer composition around the first subunit jacket and the second subunit jacket to form an outer jacket. The outer jacket includes an outer surface defining an outermost surface of the optical fiber cable, and the subunit jacket of the first optical fiber carrying subunit interfaces against the subunit jacket of the second optical fiber carrying subunit.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of an optical fiber cable including subunits are shown. The subunits discussed herein are configured to provide an optical cable with improved bending performance characteristics that Applicant believes is not previously achieved in optical fiber subunit designs. Applicant has observed that when cables with S-Z stranded subunits are installed, the stranding of the subunits degrades over time during extended use and movement. Applicant has determined that, by arranging the subunits in complimentary configurations the subunits counteract their varying asymmetrical forces to provide an improved handling performance. In specific embodiments, this improved performance is provided by having at least some of the subunits containing optical fibers/optical fiber ribbons with a left-hand helical twist and some other subunits containing optical fibers/optical fiber ribbons with a right-hand helical twist.

Figure 1:
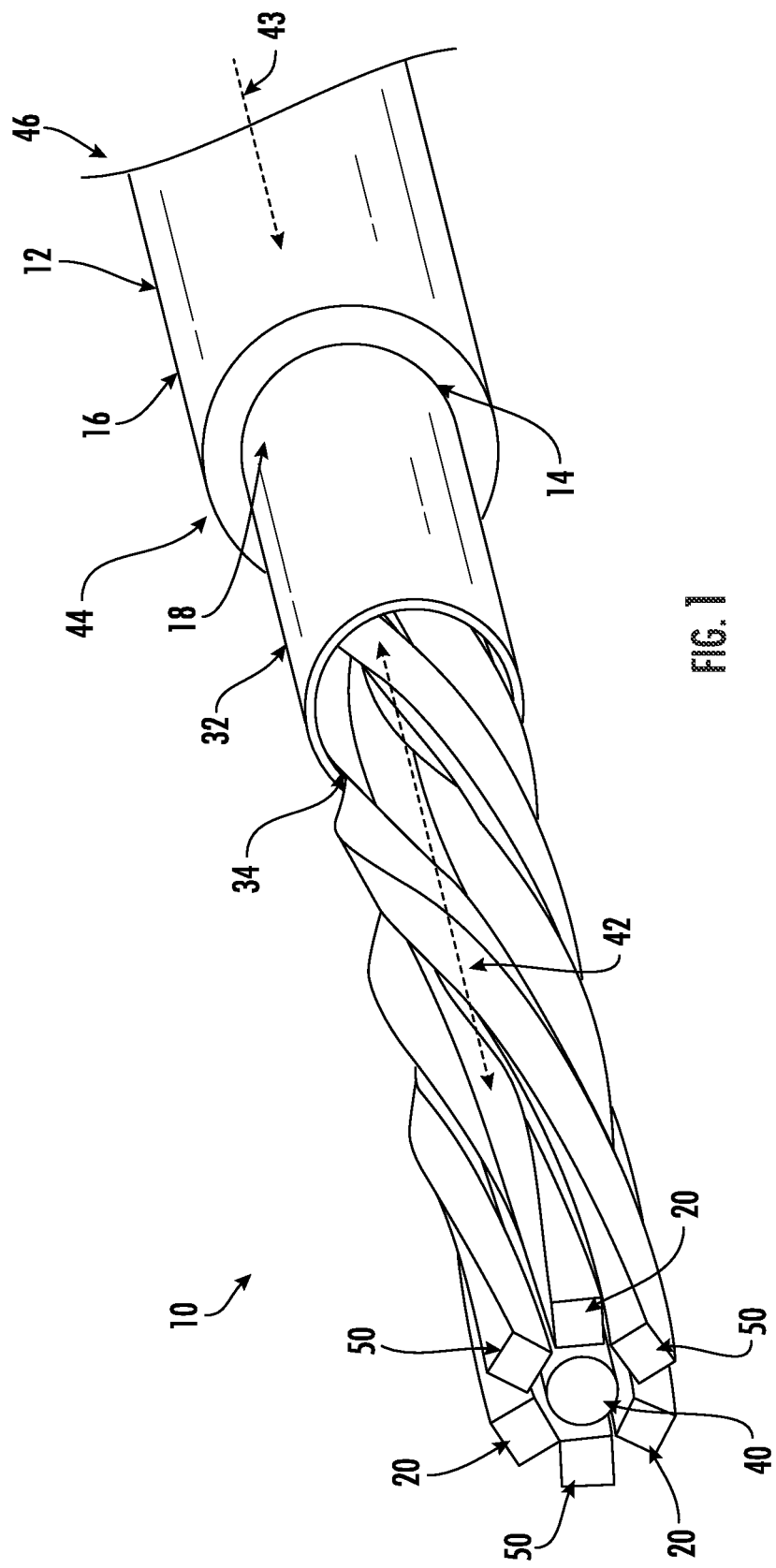
FIG. 1 depicts a perspective view of an optical fiber ribbon cable, according to an exemplary embodiment.
Figure 2:
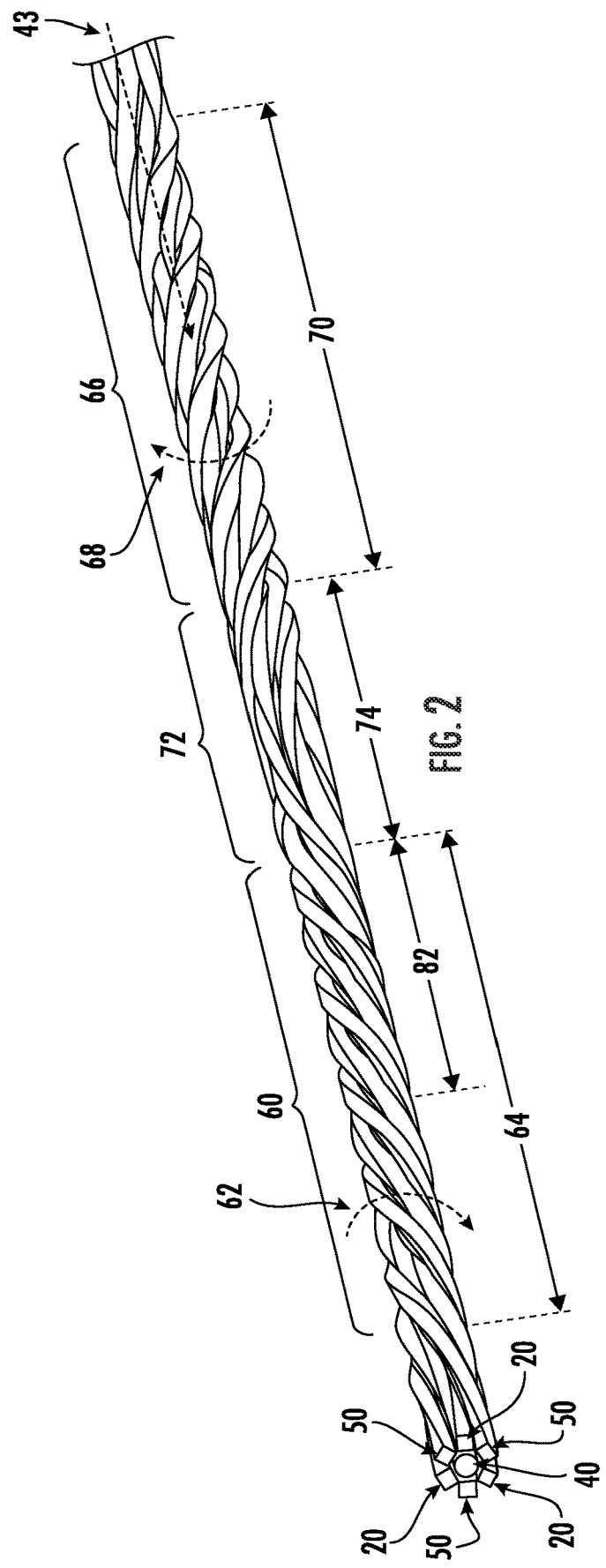
FIG. 2 depicts a perspective view of a portion of the optical fiber ribbon cable of FIG. 1, according to an exemplary embodiment.

FIG. 1 and FIG. 2 depict an optical fiber cable, shown as ribbon cable 10, according to an exemplary embodiment. The ribbon cable 10 includes an outer jacket, shown as cable jacket 12, having an inner surface 14 and an outer surface 16. The inner surface 14 defines a central bore 18, and the outer surface 16 defines an outermost extent of the ribbon cable 10. In embodiments, the outer surface 16 defines an outer diameter of the ribbon cable 10. While the term "diameter" is used, the outer surface 16 may not define a circle, and in such instances, "diameter" refers to the largest cross-sectional outer dimension of the ribbon cable 10.

In the embodiment depicted in FIG. 1, a water barrier layer 32 is located within jacket 12 and surrounds first optical fiber carrying subunits, shown as first subunits 20, and second optical fiber carrying subunits, shown as second subunits 50. Water barrier layer 32 absorbs water which in turn prevents or limits water from traveling along cable 10 and/or from contacting the subunits 20. In embodiments, the water barrier layer 32 is a water-blocking tape, e.g., that absorbs water and/or swells when contacted with water. In other embodiments, the water barrier layer 32 is an SAP powder applied to the exterior of the subunits 20 and subunits 50 and/or the inner surface 14 of the cable jacket 12. As used herein, all of the components from the water barrier layer 32 inward are referred to as the cable core 34. Cable core 34 and central bore 18 extend longitudinally in direction 43 along longitudinal axis 42 between first end 44 and opposing second end 46 of outer jacket 12. In an alternate embodiment, subunits do not include water barrier layer 32.

In various embodiments, jacket 12 is formed from a polymer material and in specific embodiments is formed from a polyolefin material. Exemplary polyolefins suitable for use in the jacket 12 include one or more of medium-density polyethylene (MDPE), high-density polyethylene (HDPE), low-density polyethylene (LDPE), linear low-density polyethylene (LLDPE), and/or polypropylene (PP), amongst others. Exemplary thermoplastic elastomers suitable for use in the jacket 12 include one or more of ethylene-propylene rubber (EPR), ethylene-propylene-diene rubber (EPDM), ethylene-octene (EO), ethylene-hexene (EH), ethylene-butene (EB), ethylene-vinyl acetate (EVA), and/or styrene-ethylene-butadiene-styrene (SEBS), amongst others. In various embodiments, jacket 12 includes a polymer composition that is flame resistant (FR), such as PVC based FR options, and the polymer composition includes various flame resistant additives and fillers, in addition to PE.

In various embodiments, a sleeve is extruded over subunits 20 and 50 to help retain the S-Z stranding of subunits 20 and 50. The sleeve comprises a material including LDPE and is located inside tape layer 32 but radially outside subunits 20 and 50. As an alternative, binders or tapes may be helically wound, such as around the subunits 20 and 50, to help retain the S-Z stranding. As yet another alternative, the subunits 20 and 50 may be stranded directly into the jacketing extrusion head, such as where outer jacket 12 is extruded.

Disposed within the central bore 18 are a plurality of subunits 20 and a plurality of subunits 50. Subunits 50 are substantially the same as subunits 20, except for the differences discussed herein.

In various embodiments, the subunits 20 and subunits 50 are S-Z stranded around a central elongate structure, shown as central filler 40. In first sections 60, subunits 20 and subunits 50 are stranded in rotational direction 62 around central filler 40, which is the S or left-hand direction. First section 60 extends distance 64 along cable 10. In reversal sections 72, which extends distance 74 along cable 10, subunits 20 and subunits 50 are stranded generally parallel to longitudinal axis 42. In second sections 66, subunits 20 and subunits 50 are stranded in rotational direction 68 opposite rotational direction 62 around central filler 40, which is the Z or right-hand direction. Second section 66 extends distance 70 along cable 10. First section 60 and second section 66 are functionally similar except for subunits 20 and subunits 50 being stranded around central filler 40 in opposite rotational directions.

In a specific embodiment, subunits 20 and subunits 50 complete between 0.75 revolutions and 5 revolutions around central filler 40 over the distance 64 of first section 60 (e.g., within first section 60). More particularly subunits 20 and subunits 50 complete between 1.5 revolutions and 2.5 revolutions around central filler 40 within first section 60, and more particularly 2 revolutions. In a specific embodiment, subunits 20 and subunits 50 rotate around central filler 40 at a rate of between 200 mm and 700 mm along cable 10 for each revolution around central filler 40 within first section 60, and more specifically between 350 mm and 550 mm. In a specific embodiment subunits 20 and subunits 50 rotate around central filler 40 a full revolution every distance 82 of 300 mm in first section 60. In a specific embodiment subunits 20 and subunits 50 rotate around central filler 40 at a rate of between 75 times X and 133 times X, where X is the diameter of subunits 20 and subunits 50, and more specifically between 90 times X and 111 times X, and even more specifically subunits 20 and subunits 50 rotate around central filler 40 at a rate of 100 times X (e.g., 550 mm per rotation for a subunit with a diameter of 5.5 mm)

Figure 3A:
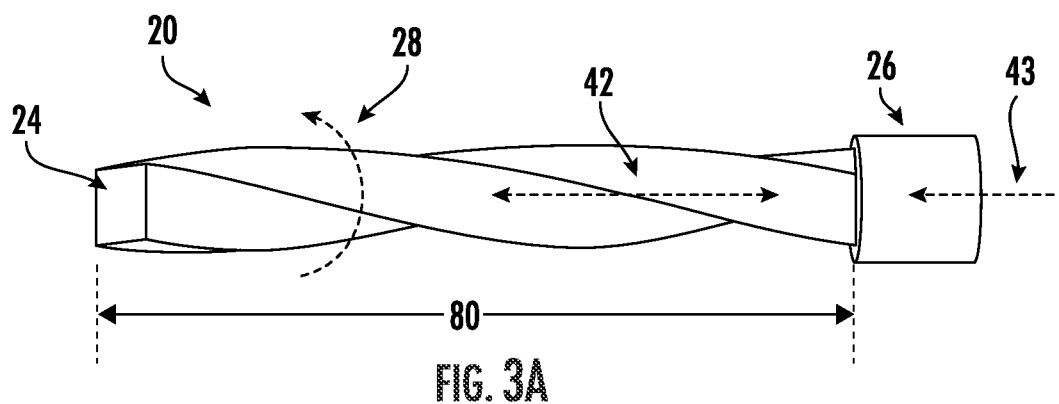
FIG. 3A depicts a detailed perspective view of a first subunit of the optical fiber ribbon cable of FIG. 1, according to an exemplary embodiment.
Figure 3B:
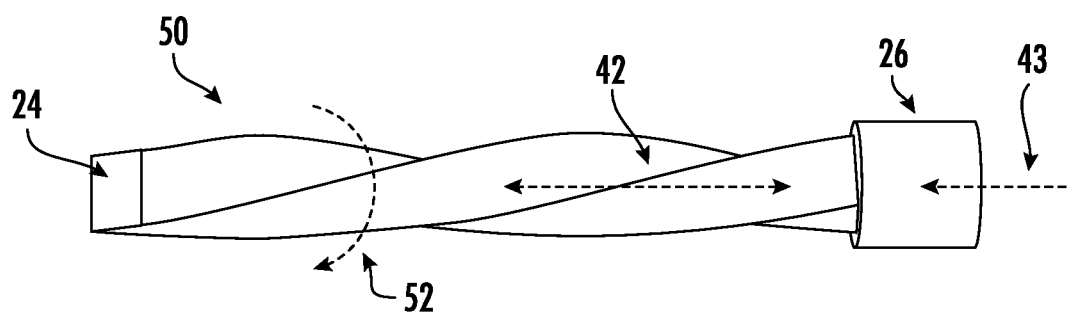
FIG. 3B depicts a detailed perspective view of a second subunit of the optical fiber ribbon cable of FIG. 1, according to an exemplary embodiment.

Referring to FIGS. 3A and 3B, depicted are exemplary embodiments of subunits 20 and subunits 50. In general, optical fibers 24 are twisted along a longitudinal axis of the respective subunits. Subunit 20 includes jacket 26, which surrounds optical fibers 24. Optical fibers 24 within jacket 26 of subunit 20 twist in a first rotational direction 28 as cable 10 extends in direction 43 along axis 42 (e.g., as outer jacket 12 extends from first end 44 to second end 46).

Subunit 50 also includes jacket 26. However, optical fibers 24 within jacket 26 of subunit 50 twist in a second rotational direction 52 opposite first rotational direction 28 as cable 10 extends in direction 43 along axis 42 (e.g., as outer jacket 12 extends from first end 44 to second end 46). In a specific embodiment such as shown in FIGS. 3A and 3B, optical fibers 24 in subunit 20 are twisted in a right-handed twist and optical fibers 24 in subunit 50 are twisted in a left-handed twist.

Within first section 60 optical fibers 24 in subunits 20 are twisted in the same rotational direction that subunit 20 is rotated around central filler 40, which is referred to as a "lang lay." Optical fibers 24 in subunits 50 are twisted in the opposite rotational direction that subunit 50 is rotated around central filler 40, which is referred to as a "regular lay." Because the rotation of subunits 20 and subunits 50 around central filler 40 is reversed in second section 66 compared to first section 60, within second section 66 subunits 20 are in a regular lay and subunits 50 are in a lang lay. Thus, in a specific embodiment half of the subunits 20, 50 are in regular lay and half of subunits 20, 50 are in lang lay within first section 60 and second section 66.

In a specific embodiment, jacket 26 of a subunit 20 contacts jacket 26 of a neighboring subunit 50 (e.g., is in contact with subunit 50). In a specific embodiment cable 10 includes a plurality of subunits 20 and a plurality of subunits 50, such as three subunits 20 and three subunits 50. In a specific embodiment each optical fiber carrying subunit of subunits 20 and subunits 50 does not interface against a neighboring optical fiber carrying subunit in which the plurality of optical fibers of the neighboring optical fiber carrying subunit are twisted in the same rotational direction as the respective optical fiber carrying subunit.

Optical fibers 24 within subunit 20 twist a full rotation (i.e., 360 degrees) within jacket 26 within distance 80. In a specific embodiment, distance 80 is between 250 mm and 650 mm, and more particularly is between 250 mm and 400 mm, and more particularly is 300 mm.

Figure 4:
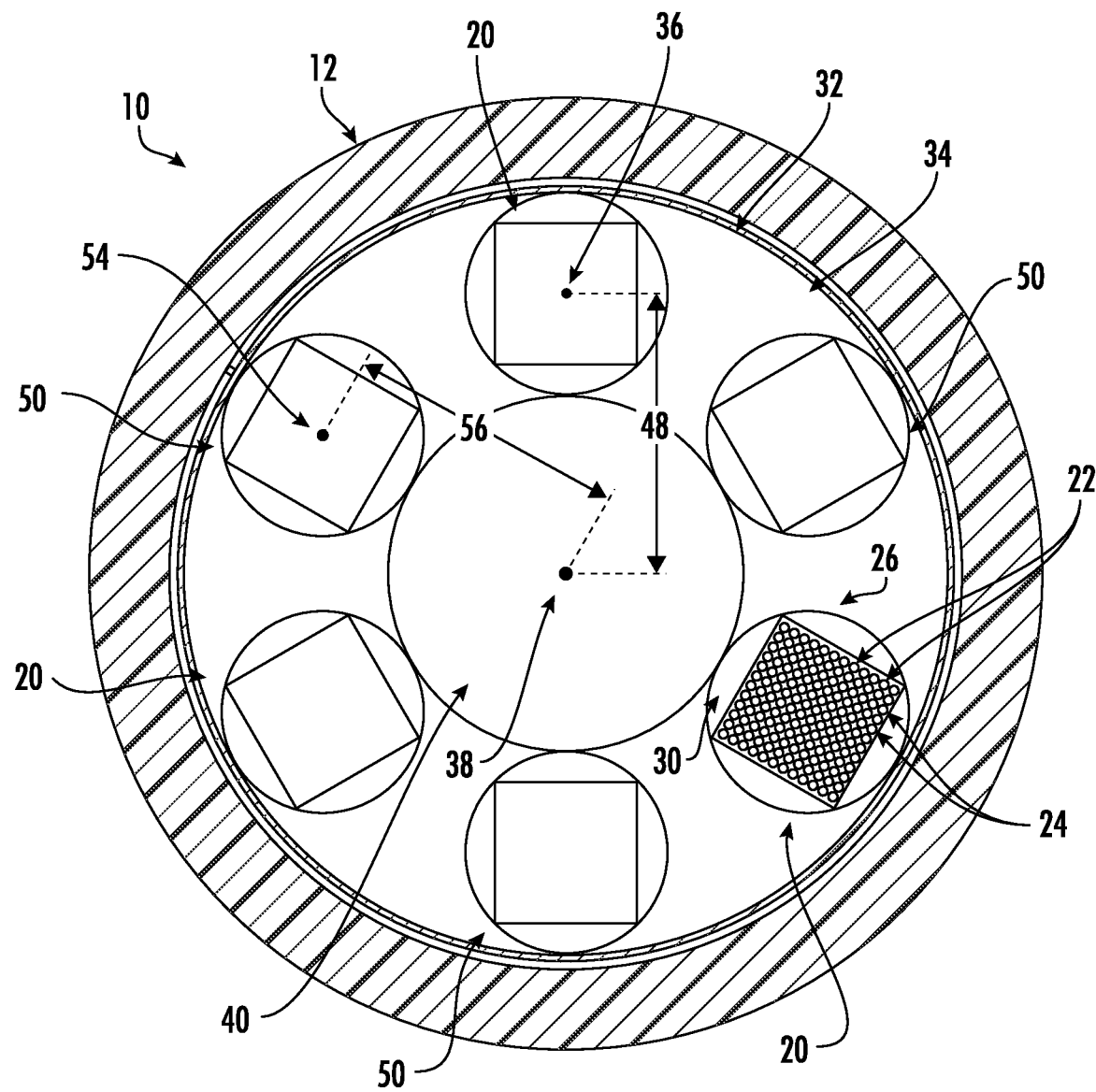
FIG. 4 depicts a cross-section of the optical fiber ribbon cable of FIG. 1, according to an exemplary embodiment.

Referring to FIG. 4, one subunit 20 is shown in detail, while the remaining subunits 20 and subunits 50 are shown schematically. As can be seen, subunit 20 includes jacket 26 that defines inner bore 30. A plurality of ribbons 22 are located within inner bore 30. Each ribbon 22 includes a plurality of optical fibers 24 in a planar configuration. The optical fibers 24 may be held in the planar configuration using a ribbon matrix material.

In various embodiments, subunit jacket 26 is comprised of a flame retardant additive dispersed, mixed, or otherwise distributed in a polymeric resin. In embodiments, the polymeric resin is a thermoplastic, and in a more specific embodiment, the thermoplastic is a polyolefin-based resin. Polymer resins that may be used for the subunit jacket 26 include a single polymer or a blend of polymers selected from the following non-limiting list: ethylene-vinyl acetate copolymers, ethylene-acrylate copolymers, ethylene homopolymers (including but not limited to low density, medium density, and high density), linear low density polyethylene, very low density polyethylene, polyolefin elastomer copolymer, propylene homopolymer, polyethylene-polypropylene copolymer, butene- and octene branched copolymers, polyester copolymers, polyethylene terephthalates, polybutylene therephthalates, other polymeric terephthalates, and maleic anhydride-grafted versions of the polymers listed herein. In embodiments, the subunit jacket 26 includes at least one flame retardant additive. Exemplary flame retardant additives include aluminum trihydrate (ATH), magnesium hydroxide (MDH), ammonium polyphosphate (APP), pentaerythritol (PER), antimony oxides, zinc borates, boehmite, intumescent materials, and red phosphorous, among others. In a specific embodiment subunit jacket 26 is a soft PVC and is in rectangular shape, following the shape of the stack of optical fibers, and is loose around the optical fibers (e.g., not tight to the optical fibers).

Center 36 of subunit 20 is located at a distance, shown as radius 48, from center 38 of cable 10 (e.g., center 38 of outer jacket 12 of cable 10). Center 54 of subunit 50 is located at a distance, shown as radius 56, from center 38 of cable 10. In a specific embodiment, radius 56 of a subunit 50 is within 50% of the radius 48 of a subunit 20 (e.g., radius 56 of subunit 50 is between 0.5 times and 1.5 times radius 48 of subunit 20), and more specifically radius 56 is less than 10% different than radius 48, and even more specifically less than 5% different. In another specific embodiment, radius 56 of all the plurality of subunits 50 is less than 20% different than radius 48 of all the plurality of subunits 20, and more particularly less than 10%, and more particularly less than 5%.

Figure 5:
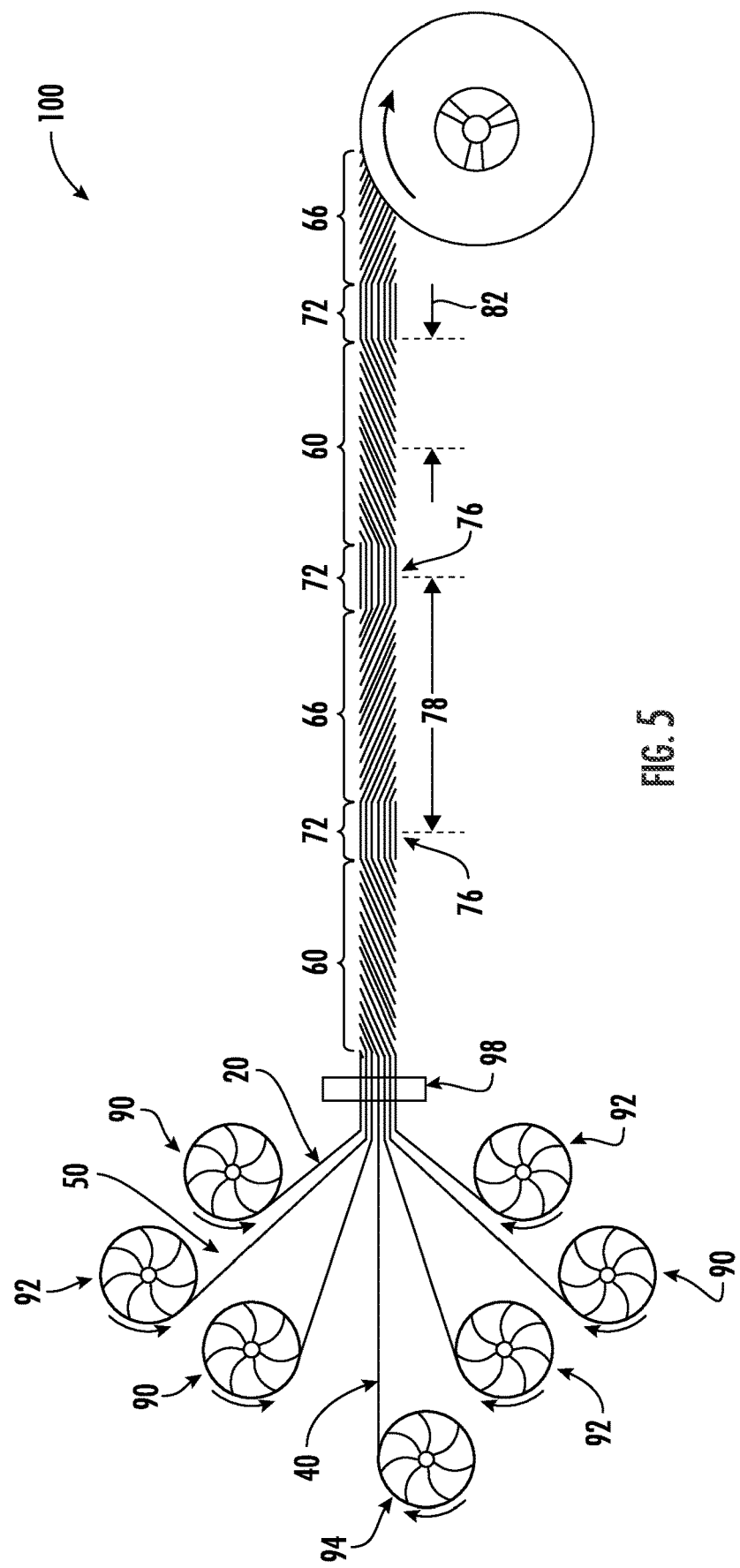
FIG. 5 is a method of manufacturing the optical fiber ribbon cable of FIG. 1, according to an exemplary embodiment.

Referring to FIG. 5, a method 100 of forming an optical cable, such as optical ribbon cable 10 is shown. According to one method of producing cable 10, subunits 20 are unspooled from spools 90, subunits 50 are unspooled from spools 92, and central filler 40 is unspooled from 94. Subunits 20 and subunits 50 are S-Z stranded around central filler 40 at station 98. As discussed above, in first sections 60 subunits 20 and subunits 50 are stranded around central filler 40 in a first rotational direction, in reversal section 72 subunits 20 and subunits 50 are stranded generally linearly (e.g., generally parallel to central filler 40), and in second sections 66 subunits 20 and subunits 50 are stranded around central filler 40 in a second rotational direction opposite the first rotational direction.

Center 76 of reversal section 72 is distance 78 apart. In a specific embodiment, distance 78 is between 600 mm and 1200 mm, and more particularly is 900 mm. Outer jacket 12 is extruded around subunits 20 and subunits 50 to produce cable 10, which is spooled around reel 96.

Figure 6:
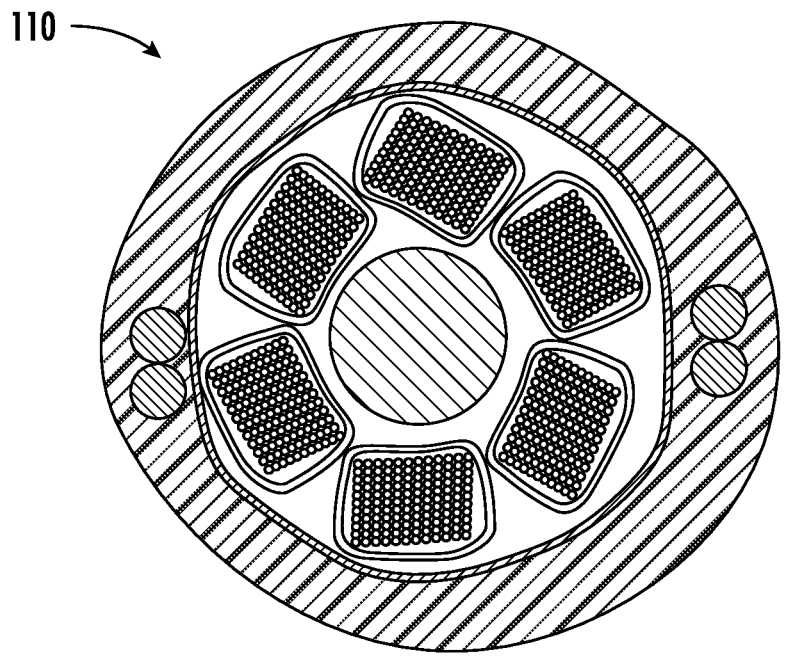
FIG. 6 is a cross-sectional view of another optical fiber ribbon cable in accordance with aspects of the present disclosure.
Figure 7:
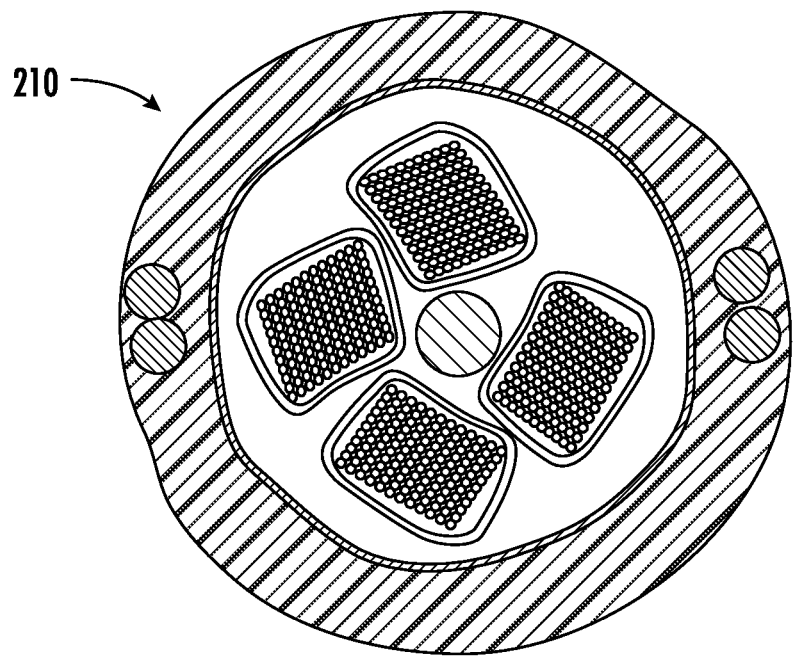
FIG. 7 is a cross-sectional view of yet another optical fiber ribbon cable in accordance with aspects of the present disclosure.

Referring to FIG. 6 and FIG. 7, ribbon cable 110 and ribbon cable 210 are shown, respectively, according to exemplary embodiments. Ribbon cable 110 and ribbon cable 210 are substantially the same as ribbon cable 10, except for the differences discussed herein. In specific embodiments, ribbon cable 110 (FIG. 6) includes 864 optical fibers, and ribbon cable 210 (FIG. 7) includes 576 optical fibers. In an alternate embodiment, the outer jacket of ribbon cable 210 (FIG. 7) is larger near the strengthening elements (arranged in two pairs of two on the left-side and right-side of the outer jacket) compared to the jacket shown in FIG. 7.

In an alternate embodiment, a ribbon cable includes 432 optical fibers arranged within three subunits each having 144 optical fibers. In another alternate embodiment, a ribbon cable includes 432 optical fibers arranged within six subunits each having 72 optical fibers. In yet another alternate embodiment, a ribbon cable includes 1728 optical fibers arranged within six subunits each having 288 optical fibers.

In still another alternate embodiment, a ribbon cable includes 3456 optical fibers arranged within three subunits in an interior layer and nine subunits in the outer layer and the inner layer and outer layer are S-Z stranded. One of the three subunits in the interior layer is twisted in an opposing direction to the other subunits in the interior layer, and at least three subunits (e.g., three subunits, four subunits) in the outer layer is twisted in an opposing direction to the other subunits in the outer layer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising:
    an outer jacket comprising a first inner surface and a first outer surface defining an outermost surface of the optical fiber cable, the first inner surface defining a central bore extending in a longitudinal direction between a first end and an opposing second end of the outer jacket; and
    a first optical fiber carrying subunit and a second optical fiber carrying subunit stranded through the central bore of the outer jacket in an S-Z stranding pattern, wherein each of the first optical fiber carrying subunit and second optical fiber carrying subunit comprises a subunit jacket defining an inner bore and a plurality of optical fibers located within the inner bore of the subunit jacket;
    wherein the plurality of optical fibers in the first optical fiber carrying subunit are twisted within the first subunit jacket in a first rotational direction as the first optical fiber carrying subunit extends from the first end to the second end of the outer jacket;
    wherein the plurality of optical fibers in the second optical fiber carrying subunit are twisted within the second subunit jacket in a second rotational direction opposite the first rotational direction as the second optical fiber carrying subunit extends from the first end to the second end of the outer jacket; and
    wherein the subunit jacket of the first optical fiber carrying subunit contacts the subunit jacket of the second optical fiber carrying subunit.

2. The optical fiber cable of claim 1, comprising:
    a first plurality of optical fiber carrying subunits that includes the first optical fiber carrying subunit, wherein each of the first plurality of optical fiber carrying subunits comprises:
        a subunit jacket defining an inner bore; and
        a plurality of optical fibers located within the inner bore of the subunit jacket, wherein the plurality of optical fibers in the subunit jacket are twisted within the subunit jacket in the first rotational direction as the optical fiber carrying subunit extends from the first end to the second end of the outer jacket; and
    a second plurality of optical fiber carrying subunits that includes the second optical fiber carrying subunit, wherein each of the second plurality of optical fiber carrying subunits comprises:
        a subunit jacket defining an inner bore; and
        a plurality of optical fibers located within the inner bore of the subunit jacket, wherein the plurality of optical fibers in the subunit jacket are twisted within the subunit jacket in the second rotational direction as the optical fiber carrying subunit extends from the first end to the second end of the outer jacket.

3. The optical fiber cable of claim 2, wherein, for each optical fiber carrying subunit of the first plurality of subunits and the second plurality of subunits, a respective optical fiber carrying subunit does not contact a neighboring optical fiber carrying subunit in which the plurality of optical fibers of the neighboring optical fiber carrying subunit are twisted in the same rotational direction as the respective optical fiber carrying subunit.

4. The optical fiber cable of claim 3, wherein the first plurality of optical fiber carrying subunits is three optical fiber carrying subunits and the second plurality of optical fiber carrying subunits is three optical fiber carrying subunits.

5. The optical fiber cable of claim 1, further comprising an elongate central structure extending through the central bore, wherein the first optical fiber carrying subunit and the second optical fiber carrying subunit are S-Z stranded around the elongate central structure.

6. The optical fiber cable of claim 5, wherein the S-Z stranding includes:
    a plurality of first sections in which the first optical fiber carrying subunit and the second optical fiber carrying subunit are stranded in the first rotational direction within the central bore;
    a plurality of second sections in which the first optical fiber carrying subunit and the second optical fiber carrying subunit are stranded in a second rotational direction opposite the first rotational direction within the central bore; and
    a plurality of reversal sections in which the first optical fiber carrying subunit and the second optical fiber carrying subunit are stranded longitudinally along the central bore;
    wherein a center of a first reversal section of the plurality of reversal sections is a distance between 600 mm and 1200 mm to a center of a second neighboring reversal section of the plurality of reversal sections.

7. The optical fiber cable of claim 1, wherein the plurality of optical fibers twists 360 degrees within the first subunit jacket over a distance between 250 mm and 400 mm.

8. An optical fiber cable comprising:
- an outer jacket comprising a first inner surface and a first outer surface defining an outermost surface of the optical fiber cable, the first inner surface defining a central bore extending in a longitudinal direction between a first end and a second end of the outer jacket;
- a first optical fiber carrying subunit and a second optical fiber carrying subunit stranded through the central bore of the outer jacket in an S-Z stranding pattern, wherein each of the first optical fiber carrying subunit and second optical fiber carrying subunit comprises a subunit jacket defining an inner bore and a plurality of optical fibers located within the inner bore of the subunit jacket;
- wherein the plurality of optical fibers of the first optical fiber carrying subunit are twisted in a first rotational direction within the first subunit jacket as the first optical fiber carrying subunit extends from the first end to the second end of the outer jacket, and wherein a center of the first optical fiber carrying subunit is located at a first radius from a center of the central bore;
- wherein the plurality of optical fibers of the second optical fiber carrying subunit are twisted in a second rotational direction within the second subunit jacket opposite the first rotational direction as the second optical fiber carrying subunit extends from the first end to the second end of the outer jacket, and wherein a center of the second optical fiber carrying subunit is located at a second radius from a center of the central bore;
- wherein the second radius is within 50% of the first radius.

9. The optical fiber cable of claim 8, further comprising an elongate central structure extending through the central bore, wherein the first optical fiber carrying subunit and the second optical fiber carrying subunit are S-Z stranded around the elongate central structure.

10. The optical fiber cable of claim 9, wherein the S-Z stranding includes:
- a plurality of first sections in which the first optical fiber carrying subunit and the second optical fiber carrying subunit are stranded in the first rotational direction around the elongate central structure within the central bore;
- a plurality of second sections in which the first optical fiber carrying subunit and the second optical fiber carrying subunit are stranded in the second rotational direction opposite the first rotational direction around the elongate central structure within the central bore; and
- a plurality of reversal sections in which the first optical fiber carrying subunit and the second optical fiber carrying subunit are stranded longitudinally along the central bore;
- wherein the first optical fiber carrying subunit and the second optical fiber carrying subunit rotate around the elongate central structure between 0.75 revolutions and 5 revolutions around the elongate central structure within at least one of the first sections.

11. The optical fiber cable of claim 10, wherein the first optical fiber carrying subunit and the second optical fiber carrying subunit rotate around the elongate central structure at a rate of between 200 mm and 700 mm per revolution.

12. The optical fiber cable of claim 8, wherein the plurality of optical fibers twists 360 degrees within the first subunit jacket within a distance between 250 mm and 400 mm.

13. The optical fiber cable of claim 8, comprising:
- a first plurality of optical fiber carrying subunits that includes the first optical fiber carrying subunit, wherein each of the first plurality of optical fiber carrying subunits comprises:
  - a subunit jacket defining an inner bore; and
  - a plurality of optical fibers located within the inner bore of the subunit jacket, wherein the plurality of optical fibers in the respective subunit jacket are twisted within the respective subunit jacket in the first rotational direction as the respective optical fiber carrying subunit extends from the first end to the second end of the outer jacket; and
- a second plurality of optical fiber carrying subunits that includes the second optical fiber carrying subunit, wherein each of the second plurality of optical fiber carrying subunits comprises:
  - a subunit jacket defining an inner bore; and
  - a plurality of optical fibers located within the inner bore of the subunit jacket, wherein the plurality of optical fibers in the respective subunit jacket are twisted within the respective subunit jacket in the second rotational direction as the respective optical fiber carrying subunit extends from the first end to the second end of the outer jacket.

14. The optical fiber cable of claim 13, wherein, for each optical fiber carrying subunit of the first plurality of subunits and the second plurality of subunits, a respective optical fiber carrying subunit does not contact a neighboring optical fiber carrying subunit in which the plurality of optical fibers of the neighboring optical fiber carrying subunit are twisted in the same rotational direction as the respective optical fiber carrying subunit.

15. A method of manufacturing an optical fiber cable, the method comprising:
- unspooling a first optical fiber carrying subunit, the first optical fiber carrying subunit comprising:
  - a first subunit jacket, the first subunit jacket comprising a first inner surface and a first outer surface, the first inner surface defining a first inner bore; and
  - a plurality of optical fibers located within the first inner bore and extending within the subunit jacket, wherein the plurality of optical fibers are twisted within the first subunit jacket in a first rotational direction;
- unspooling a second optical fiber carrying subunit, the second optical fiber carrying subunit comprising:
  - a second subunit jacket, the second subunit jacket comprising a second inner surface and a second outer surface, the second inner surface defining a second inner bore; and
  - a plurality of optical fibers located within the second inner bore and extending within the subunit jacket, wherein the plurality of optical fibers are twisted within the second subunit jacket in a second rotational direction opposite the first rotation direction;
- unspooling a central elongate member;
- S-Z stranding the first optical fiber carrying subunit and the second optical fiber carrying subunit around the central elongate member; and
- extruding a polymer composition around the first subunit jacket and the second subunit jacket to form an outer jacket, the outer jacket comprising an outer surface defining an outermost surface of the optical fiber cable, wherein the subunit jacket of the first optical fiber carrying subunit interfaces against the subunit jacket of the second optical fiber carrying subunit.

16. The method of claim 15, wherein, for each optical fiber carrying subunit, the respective optical fiber carrying subunit does not interface against a neighboring optical fiber carrying subunit in which the plurality of optical fibers in the neighboring optical fiber carrying subunit are twisted in the same rotational direction as the respective optical fiber carrying subunit.

17. The method of claim 15, wherein S-Z stranding the first optical fiber carrying subunit and the second optical fiber carrying subunit around the central elongate member comprises forming:
 a plurality of first sections in which the first optical fiber carrying subunit and the second optical fiber carrying subunit are stranded in the first rotational direction around the central elongate member;
 a plurality of second sections in which the first optical fiber carrying subunit and the second optical fiber carrying subunit are stranded in the second rotational direction opposite the first rotational direction around the central elongate member; and
 a plurality of reversal sections in which the first optical fiber carrying subunit and the second optical fiber carrying subunit are stranded longitudinally along a central bore of the outer jacket;
 wherein a center of a first reversal section of the plurality of reversal sections is a distance between 600 mm and 1200 mm to a center of a second neighboring reversal section of the plurality of reversal sections.

18. The method of claim 17, wherein the first optical fiber carrying subunit and the second optical fiber carrying subunit rotate around the elongate central structure between 1.5 revolutions and 2.5 revolutions around the elongate central structure within at least one of the first sections.

19. The method of claim 15, wherein the plurality of optical fibers twists 360 degrees within the first subunit jacket over a first distance between 250 mm and 400 mm.

20. The method of claim 15, wherein a center of the first optical fiber carrying subunit is a first radius from a center of the outer jacket, and a center of the second optical fiber carrying subunit is a second radius from a center of the central bore, and wherein the second radius is within 5% of the first radius.

* * * * *